No. 858,786. PATENTED JULY 2, 1907.
A. F. BLAIR.
CAR HAUL CHAIN.
APPLICATION FILED APR. 9, 1907.
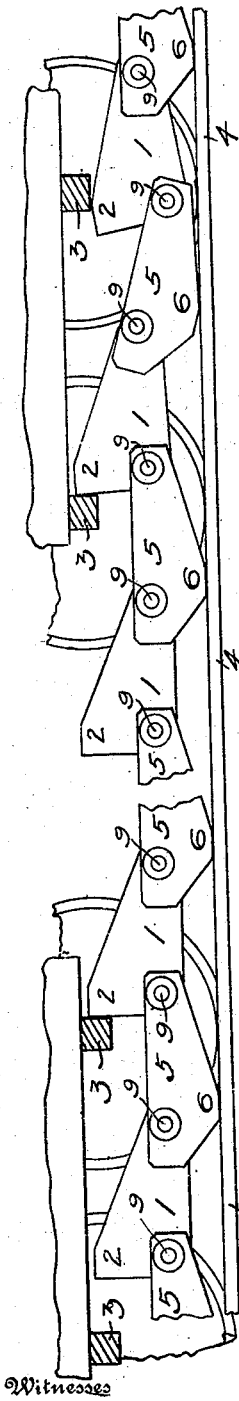
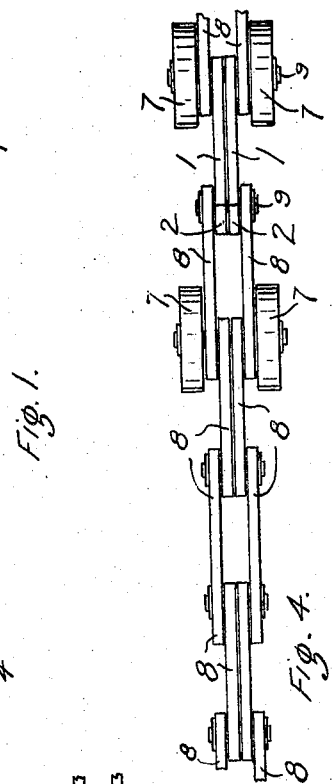
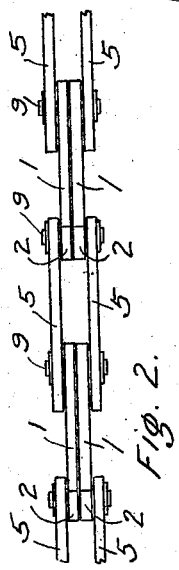
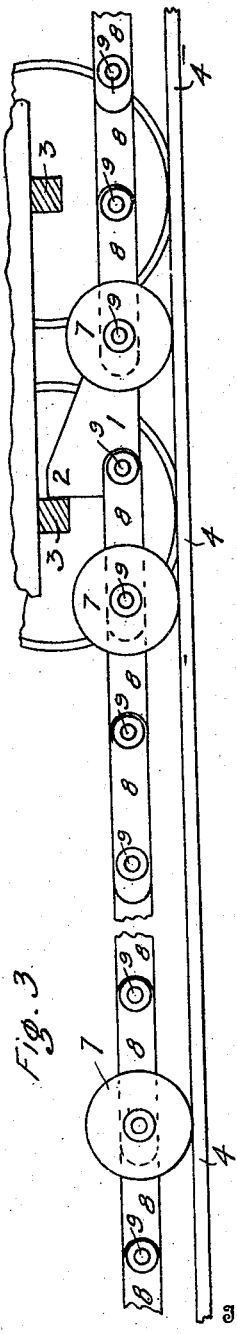
Inventor
Allen F. Blair
By P. Elliott
Attorney
Witnesses
Roy Bergerson
E. A. Prokop

UNITED STATES PATENT OFFICE.

ALLEN F. BLAIR, OF TACOMA, WASHINGTON.

CAR-HAUL CHAIN.

No. 858,786. Specification of Letters Patent. Patented July 2, 1907.

Application filed April 9, 1907. Serial No. 367,243.

*To all whom it may concern:*

Be it known that I, ALLEN F. BLAIR, a citizen of the United States of America, residing at Tacoma, in the county of Pierce and State of Washington, have invented certain new and useful Improvements in Car-Haul Chains, of which the following is a specification, reference being had therein to the accompanying drawing.

This invention relates to car haul chains especially to those for use in connection with the handling of cars such as are used in coal mines, and similar cars, and has for its object to provide a chain having car engaging means suspended above the chain supporting body in such a manner as to be readily depressed by a car axle, or projection on the car, if said axle or projection comes above said car engaging means, thereby allowing said car to pass over the chain with small resistance, should the car be moving with greater velocity than the chain, until the car decreases its speed to that of the chain, when the chain engaging mechanism will engage the car and propel the same. The said car engaging means being readily depressible by a car axle, or projection, whether the car is moving faster than, or is riding on the car engaging means, prevents said engaging mechanism from lifting the car wheels off the track and saves the consequent delay in operations and undue wear on the chain and chain supporting body. I attain these objects by the mechanism illustrated in the accompanying drawing, in which Figure 1 shows a side elevation of the form of chain preferred for hauling light cars, Fig. 2 is a plan thereof, Fig. 3 is a side elevation of the form preferred for hauling loaded cars, and Fig. 4 is a plan thereof.

Similar numerals of reference refer to similar parts throughout the several views.

Car hauls, as usually used, are built on a level or on a grade. If on a level the cars are generally coupled in a trip and are pushed onto the chain, the chain then being merely used to advance them on the level. When built on a grade the cars generally approach them at a high velocity but by running up the grade exhaust their momentum on the grade and are picked up by the chain and delivered at a higher elevation. As no two mine cars will run alike, owing to their rough handling and the abuse they get, it is impractical to have them stop in an exact position, they therefore travel over the chain to a great extent before coming to rest or to the same velocity at which the chain is moving. This, allowing the car to run over the chain, is the important feature of my invention.

The form of chain illustrated in the drawings is especially designed for up-grade, or level hauls, and consists of flat links pivoted together in the well known manner. At periodical points along the chain, links 1 are provided which are formed with an upward extension 2 adapted to engage the axle 3, or other projection, of a car. This extension 2 is made with its forward end vertical and adapted to engage one side of the axle, or other projection, and with its back or upper side inclined upward from the chain to the forward end so as to render the links readily depressible. Each of the links 1 is suspended above the chain supporting body 4 by the adjacent links 5 of the chain, said links 5 engaging the body 4 either through downward extensions 6 formed thereon or by side rollers 7. When the rollers 7 are used the links 8 are substituted for the links 5, said links 8 being plain flat links supported at intervals by the rollers 7 mounted thereon.

It is evident that if the upward extension 2 of one of the links 1 is engaged by an axle or other projection above it, the weight of the car will depress the link 1 as shown in the drawing, forcing one or both of the pivot pins 9, joining said link 1 with the adjacent links, downward out of the line of strain, and this action will occur whether the car is moving faster than the chain and is simply passing over the depressed link, or whether the car, or train of cars, is being hauled and keeps the link depressed during the trip.

Having described my invention, what I claim is:

1. In a car-haul chain, the combination of links supported by a fixed body, links depressibly suspended between said supported links above said fixed body, and means on said suspended links adapted to engage the car.

2. In a car-haul chain, the combination of links supported by a fixed body but not adapted to engage the car, and links depressibly suspended between said supported links above said fixed body and adapted to engage the car.

In testimony whereof I affix my signature in presence of two witnesses.

ALLEN F. BLAIR.

Witnesses:
C. E. STEVENS,
ALICE M. BOWIE.